W. ESPENHAYN & F. O. HUNGER.
WEIGHING MACHINE.
APPLICATION FILED SEPT. 27, 1909.

1,116,254.

Patented Nov. 3, 1914.
7 SHEETS—SHEET 1.

Fig. 1.

W. ESPENHAYN & F. O. HUNGER.
WEIGHING MACHINE.
APPLICATION FILED SEPT. 27, 1909.

1,116,254.

Patented Nov. 3, 1914.

UNITED STATES PATENT OFFICE.

WILHELM ESPENHAYN AND FRIEDRICH OSWALD HUNGER, OF CHEMNITZ, GERMANY.

WEIGHING-MACHINE.

1,116,254.   Specification of Letters Patent.   Patented Nov. 3, 1914.

Application filed September 27, 1909.   Serial No. 519,888.

*To all whom it may concern:*

Be it known that we, WILHELM ESPENHAYN and FRIEDRICH OSWALD HUNGER, mechanical engineers, citizens of the German Empire, residing at Chemnitz, Germany, have invented certain new and useful Improvements in Weighing-Machines; and we do hereby declare the following to be a full, clear, and exact description of the invention, such as will enable others skilled in the art to which it appertains to make and use the same.

Our invention relates to improvements in weighing machines, and particularly in machines for weighing liquids. And the object of the improvements is to provide a machine of this class by means of which liquids can automatically be weighed with great accuracy and which is reliable in operation.

With this object in view our invention consists in the matters to be described hereinafter, and to be particularly pointed out in the appended claims which form a part of this specification, reference being had to the accompanying drawings and the letters of reference marked thereon.

In said drawings Fig. 9, is an end view of Fig. 8, Figs. 10 to 12, are detail views showing the counterpoise end of the main scale beam, the subsidiary scale beam for lifting the same under a primary load, and an abutment for temporarily arresting the upward movement of the main scale beam under the impact imparted thereto by the subsidiary scale beam, Fig. 10 showing the parts in the position in which the subsidiary scale beam has begun its rocking or lifting movement, Fig. 11, showing the parts in the position in which the subsidiary scale beam has arrived at its end position and moved the abutment for the main scale beam to its arresting position, and Fig. 12 showing the parts as they are returned into their inoperative positions at the end of a weighing operation.

The same letters of reference have been used in all the views to indicate corresponding parts.

Referring to the example illustrated in the drawings, our improved weighing machine is provided with a plurality of weighing receptacles or vessels 2 combined to form a rotary drum which under the load of liquid to be weighed is adapted to rotate in one direction, and by such rotation the receptacles 2 are successively brought into filling and weighing position, whereupon they are tilted to discharge their load of weighed liquid. In the construction shown, the said drum is formed with three receptacles or chambers. As shown the bottom part of each receptacle 2 is located within the upper part of the adjacent receptacle, and it provides a braking element whereby the rotary movement of the drum is retarded when it is tilted out of weighing position into position for pouring the weighed liquid out, as will be explained hereinafter.

Figure 7:
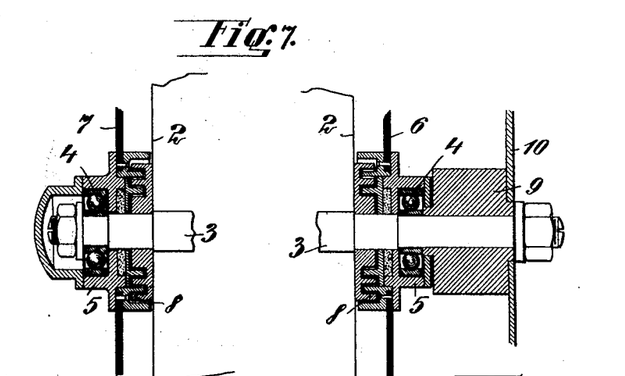
Fig. 7, is a vertical section of the bearings of the weighing drum.

In the rectangular casing 1 the rotary drum 2 which has somewhat the section of a three toothed ratchet wheel is mounted upon an axle 3 which runs in ball bearings 4 arranged in the bushes 5 on the front wall 6 and back wall 7 of the casing. In order to protect the moving parts from the attack of moisture, grooves 8 are provided between the rotary drum 2 and the bush 5 (Fig. 7).

On the end of the axle 3 extending through the front wall 6 of the casing 1 is a toothed disk 9 with three teeth (corresponding to the three chambers of the rotary drum) and in front of this is a disk 10 with three radially extending arms 11. Each of these arms carries near its end a pin 12 projecting toward the wall of the casing.

Figure 3:
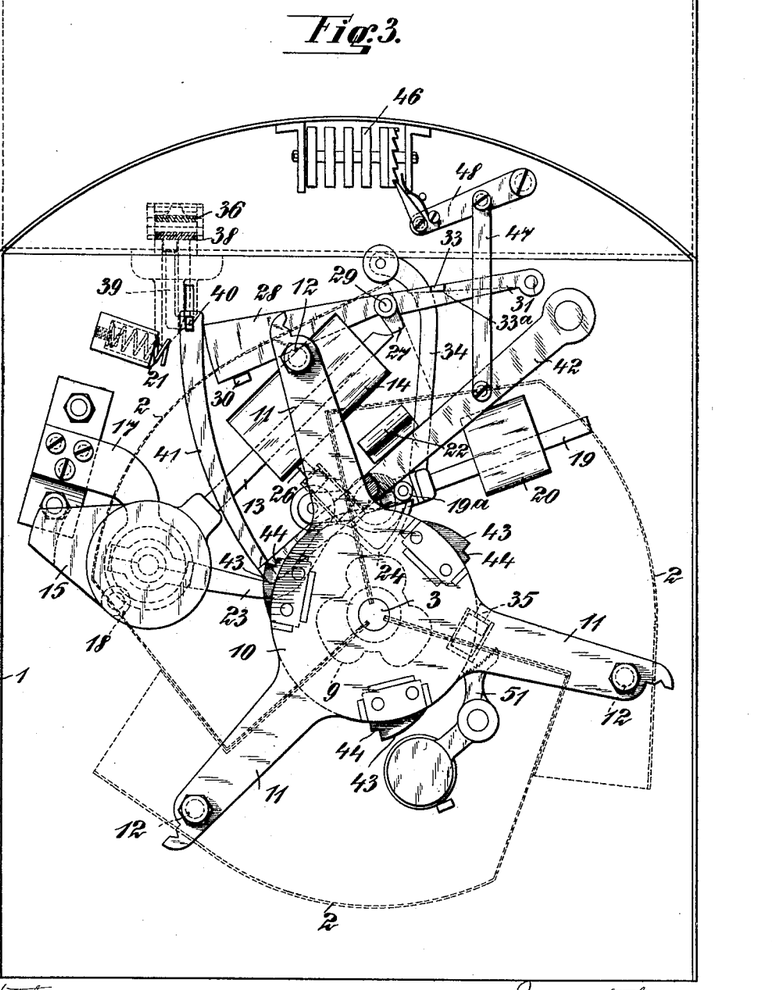
Figure 4:
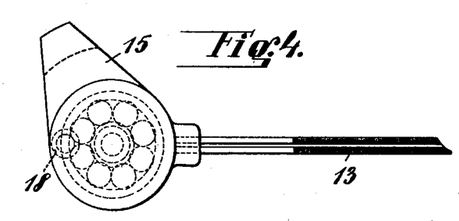
Fig. 4, is a side view of a detail showing the fulcrum of the scale beam.
Figure 5:
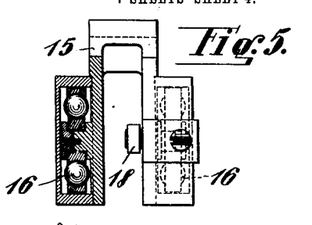
Fig. 5, is an end view, partly in section, of Fig. 4, Fig. 6, is a detail view showing the lever carrying the buffer for the scale beam.

Near the circle which the pins 12 describe is the fulcrum of the main weighing beam which has unequal arms, its longer am 13 being loaded with a weight 14 held in adjustment upon it by means of a screw 13'. The arm 13 of this weighing beam is mounted on one of the two legs of a horse shoe shaped part 15 in recesses in which are arranged ball bearings 16 which diminish the friction between the weighing beam and its supporting bracket 17. The arms 11 when they revolve pass between the legs of the weighing beam support; in so doing their pins 12 strike against a projection 18 arranged in one of the legs in the prolongation of the lever arm 13 beyond its axis. If the arm 11 which rests for the time being upon this projection 18 is to sink farther as the filling of the corresponding chamber of the rotary drum gradually proceeds, it must press down the projection 18, lift the longer lever arm 13 and the weight 14 of the weighing beam until its pin 12 escapes therefrom. In this manner it is made certain that the chamber of the rotary drum can only empty its contents when it has exactly the predetermined weight (Fig. 3).

Figure 1:
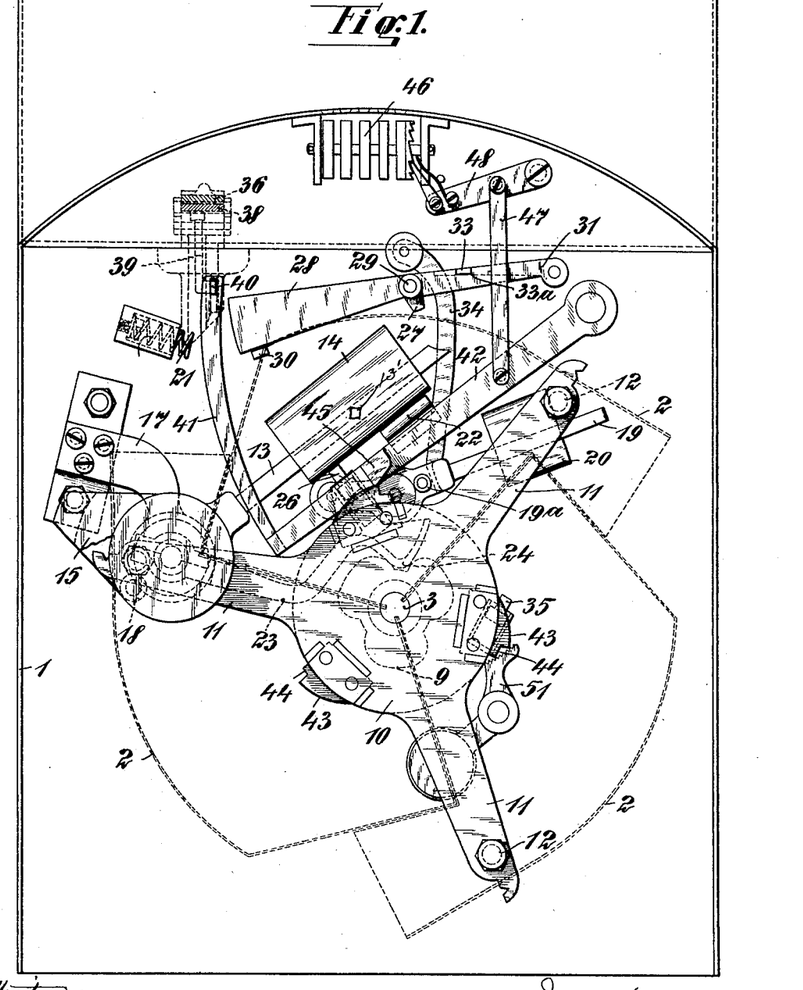
Figures 1 to 3 are front views of the machine with the front wall removed and showing the same in three different positions of its parts, Fig. 1 showing the same in the position of the parts in which the weighing receptacle is unloaded, Fig. 2 showing the same in the position of the parts in which a primary load has been filled into the weighing receptacle, so that the scale beam has been lifted one step, and the supply to the weighing receptacle is reduced to a drip filling, and Fig. 3 showing the same in the position in which the full load has been filled within a weighing receptacle.
Figure 2:
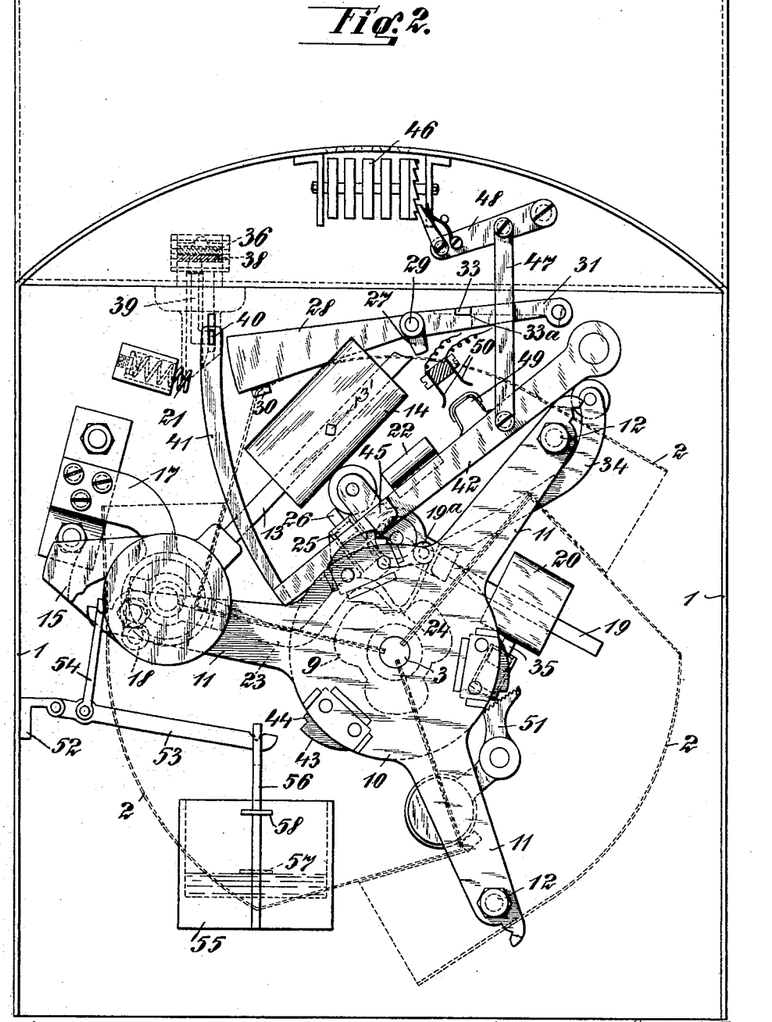
Figure 11:
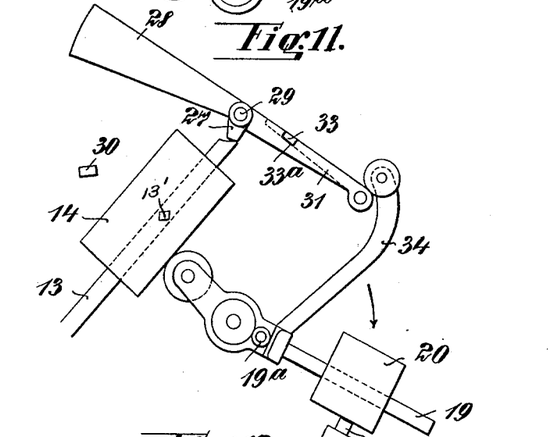
Figure 12:
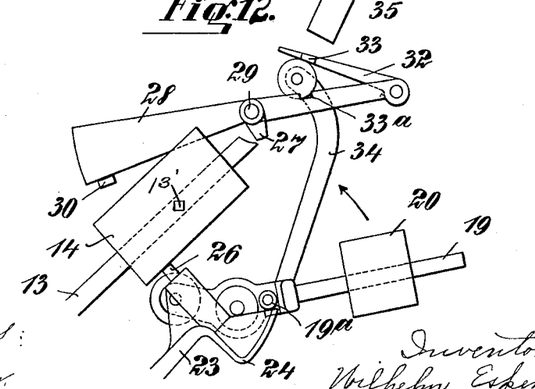

There coöperates with the main weighing beam 13 an auxiliary weighing beam 19 which oscillates upon an axle in the wall 6 of the casing and carries an adjustable weight 20 on its longer arm. Its shorter arm rests against the under side of the weight 14 of the main beam and lifts this slowly before the weight of the chamber of the rotary drum which is being filled is sufficient to turn the main beam (Fig. 2). In order to prevent the main beam being swung over as it is thus gradually raised, a small catch piece 27 is brought forward at the same time into engagement with the end of the main beam (Fig. 11). This catch piece 27 is mounted on a two-armed lever 28 which revolves about a pin 29 on the wall 6 of the casing, and has its left arm so loaded that it ordinarily rests upon a stop 30 and holds the catch 27 out of the way of the main weighing beam 13 (Fig. 1). The unloaded arm 31 of the lever 28 carries linked to its end a pawl 32 with a horizontal projection 33; the pawl 32 can move upward from the lever arm 31 but not downward because the horizontal projection 33 engages in a notch 33$^a$ in the arm 31 (Fig. 1). An arm 34 serves to actuate this catch device, this arm being mounted approximately at right angles upon the auxiliary weighing beam 19 and projecting upward. If the longer arm of the auxiliary weighing beam rises, the upper end of the arm 34 passes under the pawl 32 and raises this so high that it slides away from the upper end of the arm 34 and falls back again whereupon it is held fast on the lever arm 31 by the horizontal projection 33 which falls into the notch 33$^a$ (Fig. 12). If the auxiliary weighing beam 19 sinks again, the arm 34 carries the pawl 32 and also the arm 31 of the catch device with it during its movement pressing them downward (Fig. 11) and so swinging the catch 27 into the path of the main beam 13 (Fig. 11). During this momentary movement therefore, the catch 27 is brought in front of the end of the main beam 13 and prevents this from suddenly swinging upward. As the auxiliary beam falls the arm 34 falls also, the catch lever 27, 28, 31 swings back again into its position of rest (Fig. 2) and the main weighing beam 13 can be slowly lifted if the corresponding amount of water has flowed into the chamber of the rotary drum to be filled. The impact of the weight 20 of the auxiliary beam 19 upon its rest is diminished by means of an air buffer 35 (Fig. 2).

Figure 13:
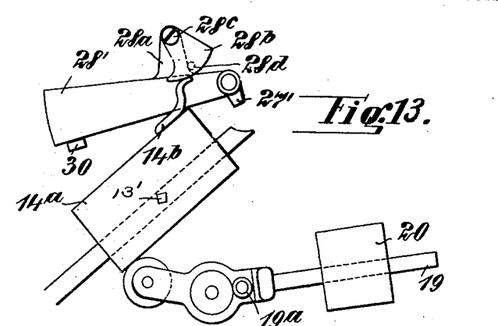
Figs. 13 to 15 show a modification of the construction of the means shown in Figs. 10 to 12, Fig. 13 showing the parts at the beginning of the operation of the subsidiary scale beam, Fig. 14 showing the same at the end of the operation of the subsidiary scale beam, and Fig. 15 in the position in which the parts are returned to their normal positions at the end of a weighing operation.
Figure 14:
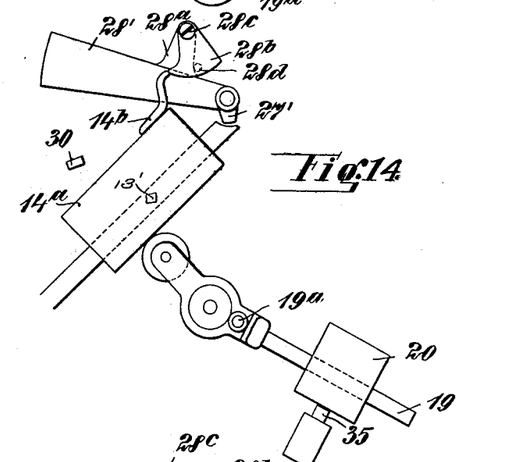
Figure 15:
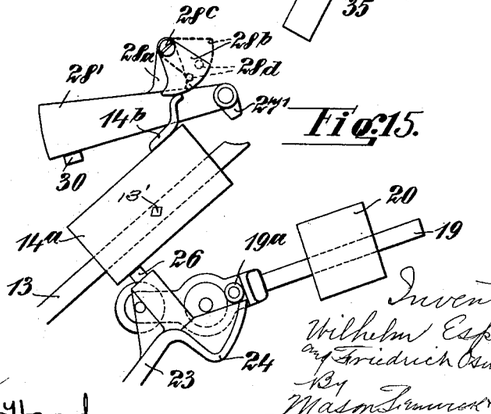

Another modification of this catching device is shown in Figs. 13 to 15. Here the arm 28' carries a projection 28$^a$ extending upward. A triangle disk 28$^b$ with its lower edge curved can oscillate around a pin 28$^c$ fixed near the upper end of the part 28$^a$. The disk 28$^b$ carries on its rear face a pin 28$^d$ in contact with the side edge of part 28$^a$ and preventing the disk 28$^b$ from swinging to the left with regard to the part 28$^a$. The weight 14$^a$ of the main weighing beam carries an upwardly extending projection or finger 14$^b$ adapted to come into contact with the curved lower edge of the disk 28$^b$ whenever the loaded arm of the main beam rises and in pressing against the disk to lift the arm 28' until its catch piece 27' is swung into the path of the main beam (Fig. 14). Immediately after this the finger 14$^b$ passes from underneath the disk 28$^b$ and the arm 28' is allowed to fall back into its initial position, at the same time carrying the catch piece 27' out of the path of the main beam which is thus allowed to continue its upward movement. Upon returning to its position of rest the finger 14$^b$ fastened to the main beam in striking against the left hand edge of the disk 28$^b$ causes this latter to swing to the right, thus allowing the finger 14$^b$ and the main beam to pass, whereupon the disk returns to its initial position (Fig. 15).

Figure 6:
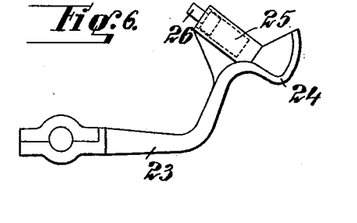

If the main beam 13 is swung upwardly by the completely filled chamber of the rotary drum or by the arm 11 belonging thereto, so far that the pin 12 of this arm can slip away from the projection 18, the weight 14 swinging upward strikes against a buffer spring 21 so that it then falls back with the main beam into its position of rest. To prevent the weight 14 falling heavily upon its resting block 22 mounted on the wall 6 and striking the shorter arm of the auxiliary weighing beam 19, the following construction is devised: Behind the axle of the main weighing beam there is mounted on the wall 6 of the casing a pin about which revolves an arm 23 curved into an S-shape (Fig. 6). This arm has a tooth 24 pointing downward and resting on the toothed disk 9, the teeth of which moving beneath it raise it up. The arm 23 carries an upwardly projecting air buffer which consists of a small cylinder 25 and a piston 26 movable therein. If the arm 23 is raised by a tooth of the disk 9 (as happens at the moment when the weight 14 of the main weighing beam falls back into its position of rest) it raises the air buffer above the level of the resting block 22; the weight 14 therefore strikes on the buffer which breaks its fall. At the same time the end of the arm 23 raises the longer arm of the auxiliary weighing beam by engagement with the roller 19ᵃ, until its shorter arm sinks beneath the level of the air buffer, and therefore cannot be struck by the falling weight 14 (Fig. 3).

The form of the chambers of the rotary drum is so chosen that each chamber must be filled up to a certain height with fluid before the rotary drum turns so far that the projecting pin 12 of the arm 11 belonging to the chamber rests upon the projection 18 of the main weighing beam.

Figure 8:
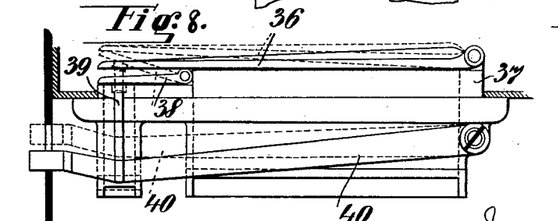
Fig. 8, is a side view of the inlet valves for regulating the supply of liquid to the weighing receptacles.
Figure 9:
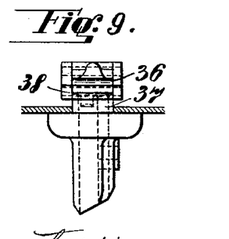
Figure 10:
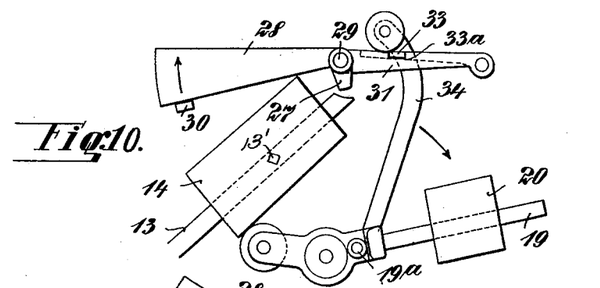

The gradual diminution of the supply of fluid to the chamber which for the time being has to be filled is preferably effected, by a gradual sinking of two valve flaps 36 and 38 upon their seats. For this purpose the valve flap 36 (Figs. 8 and 9) is prolonged beyond its inlet slit 37 and beneath this prolongation a small valve flap 38 is arranged with a special inlet slit, the free end of which flap when it is raised, raises the valve flap 36 as is indicated in dotted lines in Fig. 8. According to the position of the small flap 38, therefore, the position of the valve flap 36 and the magnitude of the two inlet openings is adjusted. The actuation of the small flap 38 is effected by means of the arm 39 of a lever 40 mounted beneath and parallel to the valve flap 36 pressing against it from below; the free end of the lever 40 projects through a slit in the wall 6 of the casing and is there embraced by the upwardly directed arm 41 of the lever 42 which turns about a pin on the wall 6, Adjacent to the disk 10 a rocker or lever 42 is located which is pivotally supported on the casing of the machine. At points intermediate the arms 11, the disk 10 carries teeth or cams 43 of hardened steel. At its rear end, taken in the direction of rotation of the disk 10, each of the said cams is formed with a shoulder or step 44 which is nearer to the axis of the shaft 3 than the main surface of the cam. The lever 42 is formed with a nose 45 projecting sidewise therefrom and into the path of the cams 43. When one of the cams moves under the nose it raises the latter and thereby the lever 42, the arm 41 of which lifts the lever 40, and little flap 38, and this raises the valve flap 36 so that the inflow openings of both flaps 36 and 38 are opened (Fig. 8 dotted position of the flaps 36 and 38). If the rotary drum turns farther as the filling of the chamber proceeds, as happens when the main weighing beam 13 rises from its resting position and the auxiliary weighing beam 19 sinks upon its resting position (air buffer 35) the tooth 43 of the disk 10 is withdrawn from under the projection 45 and this falls first upon the step 44; upon this the lever 42 with the arm 41, lever 40 and the small flap 38 sinks so far that the large valve flap 36 quite closes its inflow opening and only the inflow slit of the small valve flap 38 is open (Fig. 8 full lines of the large flap 36 and dotted lines of the small flap 38 beneath it). If the chamber is completely filled the step 44 is drawn from beneath the projection 45 and this falls upon the circumference of the disk 10. The lever 42, 40 then sinks again so that the small valve flap 38 also now falls upon its inflow slit and completely closes it. (Fig. 8 full lines of the small flaps 38). While for the purpose of explaining the invention reference has been made to a construction of the machine in which the cam 43 has only two operative surfaces, and in which therefore the inlet to the weighing receptacles is either closed, completely opened, or partly open, we wish it to be understood, that our invention is not limited to such construction.

Figure 16:
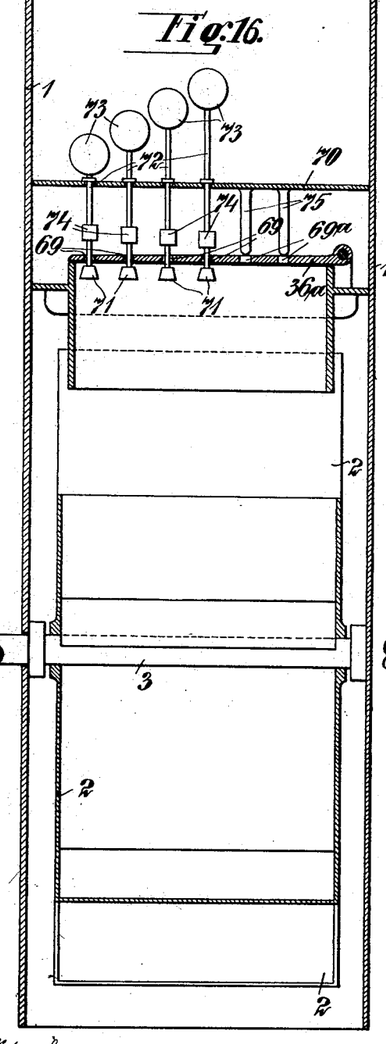
Figs. 16 and 17 are vertical longitudinal sections of a modification of the inlet valve and of the weighing drum, Fig. 16 showing the parts in the position in which the drip supply takes place, and Fig. 17 in the position in which the inlet is completely open.
Figure 17:
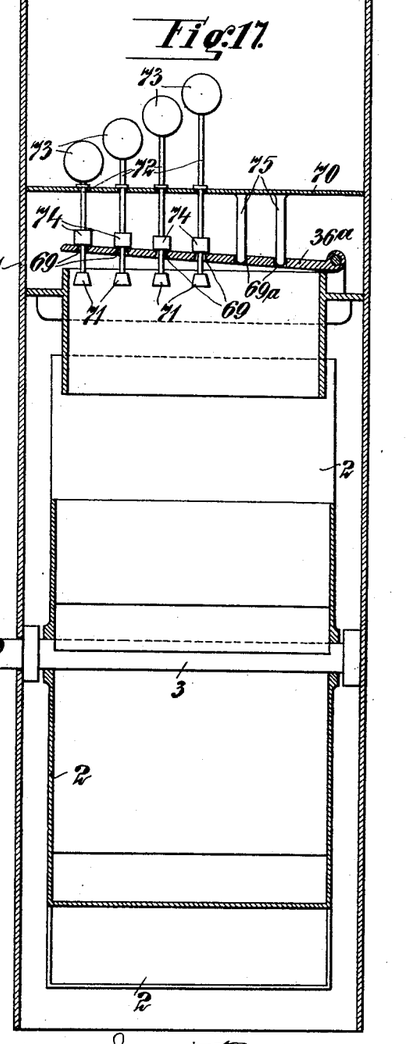

Instead of using two valve flaps for gradually diminishing the liquid supply to the tilting vessel, a single valve flap may be used, this flap being brought down when the valve seat upon the respective chamber of the rotary drum is nearly filled, the liquid then running in thin streams through vertical perforations in the valve flap. But in order to secure absolute correctness of supply, we must also take account of the increased pressure of the liquid which rapidly collects above the valve flap. In order to meet this problem, the arrangement has been devised which is illustrated in Figs. 16 and 17. According to these figures, the perforations 69 of the valve flap 36ᵃ can be successively closed corresponding to the height of the liquid level in the inlet funnel by means of auxiliary valves, so that finally only one pair of perforations remains open.
Underneath each perforation 69 is suspended a valve cone 71 from a thin rod 72 which is passed through the perforation without completely filling it and projects outward and passes through a hole in the cover 70.
The valve rods 72 have various lengths and are provided at their upper ends with floats 73. When the valve flap 36ᵃ is opened the valve rods rest upon the flap by means of their projections 74. When the valve cover is closed, the perforations 69 remain at first open because their valve cones 71 hang a little distance below them. When however, the liquid rises in the inlet funnel, it raises first one then another float and closes thereby consecutively the perforations 69 so that in spite of the increased liquid height the liquid penetrating through the valve flap remains approximately the same. The perforations 69 are kept clear of dirt by means of the valve rods 72 and the same is effected for the perforations 69ᵃ by rods 75 which depend from the cover 70 and penetrate into the perforations 69ᵃ when the valve flap is raised.
The counting device 46 which counts the number of chambers filled and so gives the amount of fluid can be actuated, for example, by an arm 47 provided with a pawl 48 and raised by the lever 42. If it is desired that the quantity shall be given at a distance also an arrangement for example like that illustrated in Fig. 2, may be actuated electrically, by the provision of an insulated metal plate 49 on the lever 42 which closes a circuit to the distance spot at the contacts 50 each time the lever 42 is raised.

The swinging to and fro of the rotary drum after the emptying of the chamber is prevented by means of a weighted lever 51, the toothed end of which engages against a tooth 43 which for the time being is opposite to it or against any other retaining device.
In order that the user of this measuring device may always be able to adjust it correctly as well as control it subsequently, a weighing beam 53 is hinged on a bracket 52 on the casing 1 as shown in Fig. 2, and the supporting rod 54 of this beam can be suspended from the end of one of the arms 11 which is grooved for this purpose. On the free arm of the weighing beam 53 is suspended a hollow weight 55 on the supporting rods 56 of which two marks 57, 58 are arranged at different heights. If the hollow weight is filled with water up to the mark 57 the pin 12 of the arm 11 must press so forcibly on the projection 18 of the main weighing beam and raise the latter so far that the auxiliary weighing beam 19 can fall back into its resting position. When this has been properly effected the hollow weight 55 is filled with water up to the mark 58; it must now draw out the arm 11 so far that the main beam is fully raised and the rotary drum turns to empty its chamber. If the two weighted levers do not carry out the desired movement correctly, the weights upon them must be adjusted.

All the arms and levers can be provided with rollers at their ends in order to diminish friction and wear.

The method of operation of the device is as follows: The two valve flaps 36, 38, are open, according to the dotted lines in Fig. 9, because the horizontal projection 45 of the lever 42 lies upon the highest point of the tooth 43 and the arm 39 of the lever 40 pressing up from beneath holds both valve flaps open. The main weight 14 lies on its rest 22. The auxiliary weighing beam 19 with the weight 20 is raised up so that the arm 34 fastened thereto is above the arm 31 of the two armed lever 28. The pawl 32 rests on its horizontal projection 33 upon the lever 31. The pin 12 of the arm 11 in action for the time being rests on the projection 18 of the main weighing beam 13. The liquid pours into the chamber of the rotary drum to be filled; the shorter arm of the auxiliary weighing beam 19 which presses upward against the weight 14 of the main weighing beam 13 raises this latter slowly so that the arm 34 slides over the arm 31 of the two armed lever 38, draws it down and brings the catch 27 for a moment in front of the upper end of the main weighing beam 13 and so stops it. Upon this the horizontal projection 45 falls from the highest part of the tooth 43 on to the step 44; with it sinks the lever 42, the arm 41 of the lever 40 and the small flap 38, until the large valve flap 36 quite closes its inflow opening and only the inflow opening of the small valve flap 38 is left open. Now the liquid flows in a lesser stream through the inflow opening of the small flap 38. This continues until the weight of the inflowing liquid overcomes the weight of the main weight 14, and the chamber of the rotary drum turns downward for emptying. Through this movement the step 44 also is withdrawn from beneath the projection 45 and this latter falls on to the circumference of the disk 10. Upon this the levers 42 and 40 sink again so that now the small valve flap also rests upon its inflow slit and completely closes it. Upon the revolution of the rotary drum the pin 12 of the arm 11 slips down from the projection 18 so that the main weighing beam 13 is swung completely out and strikes with its weight 14 against the buffer spring 21. Through the further revolution of the disk 10 the cylinder 25 with the piston 26 on the arm 23 is raised by the tooth of the disk 9 above the level of the resting beam 22 before the weight 14 again reaches this rest 22, and the weight 14 then strikes on the buffer which breaks its fall. Simultaneously the end of the arm 23 engaging with the small roller 19$^a$ raises the longer arm of the auxiliary weighing beam 19 until its shorter arm sinks beneath the level of the air buffer so that the falling weight 14 cannot strike it. When the longer arm of the auxiliary weighing beam 19 thus rises the arm 34 screwed to it rises also. Its free end strikes the under side of the pawl 32 and raises it, after which it again falls back into its resting position and the roller on the free end of the arm 34 comes upon the pawl 32. The arm 11 next to that which has just slipped by now comes over the projection 18 without touching it, this being occasioned by the special form of the chambers of the rotary drum which is so chosen that each chamber must first be filled to a certain height with liquid before the rotary drum turns so far that the projecting pin 12 of the arm 11 belonging to the chamber rests upon the projection 18 of the main weighing beam 13. As the arm 11 which now comes into operation is brought to its proper position the horizontal projection 45 rises again on to the highest point of the next tooth 43, so that in consequence of the opening of the valve flaps described initially the entry of the water begins afresh.

When a receptacle 2 has been completely filled the rotary drum is disengaged from the stop pin 18 and it is advanced one step under the weight of the liquid within the filled receptacle. The momentum which is thereby imparted to the drum is annulled by a braking element which is provided by the bottom of the receptacle disposed within the upper part of the filled receptacle. This bottom is struck by the surface of the liquid which flows out of the filled receptacle, and as the blow imparted thereby to the drum is in opposition to the momentum of the latter, it tends to arrest the drum. In the practice of our invention we have found this braking action to be very effective.

Having now particularly described and ascertained the nature of our said invention and in what manner the same is to be performed, we declare that what we claim is:

1. In a weighing machine for liquids, the combination with a tilting receptacle for the liquid to be weighed, and weighing means coöperating with said receptacle and arranged to allow tilting movement of the same under a certain load of liquid, the receptacle having a braking surface above the liquid within said receptacle when filled and below the discharge thereof when in filling position, said braking surface being arranged to be struck by the liquid upon the tilting movement of the receptacle.

2. In a weighing machine for liquids, the combination with a tilting receptacle for the liquid to be weighed, and weighing means coöperating with said receptacle and arranged to allow tilting movement of the same under a certain load of liquid, the receptacle having a braking surface above the liquid within said receptacle when filled and below the discharge thereof when in filling position, said braking surface being arranged to be struck by the liquid upon the tilting movement of the receptacle, and means to positively arrest the tilting movement of said receptacle.

3. In a weighing machine for liquids, the combination with a tilting receptacle for the liquid, and a scale beam coöperating with said receptacle and arranged to permit tilting movement of said receptacle under a certain load of liquid, a braking surface formed on the receptacle therein and having the bottom thereof above the level of the liquid within the receptacle when filled and below the discharge thereof when in filling position and adapted to be struck by the liquid upon the tilting movement of the receptacle.

4. In a weighing machine for liquids, the combination with a plurality of tilting receptacles for the liquid arranged on a common rotary shaft, and weighing means adapted to successively coöperate with the said receptacles and arranged to allow rotary movement thereof under a load of liquid, the bottom plate of each receptacle being disposed within the preceding one and so as to be substantially horizontally above the level of the liquid within the receptacle when filled and below the discharge thereof when in filling position and to be struck by the said liquid upon the rotation of the receptacles.

5. In a weighing machine for liquids, the combination with a plurality of tilting receptacles for the liquid arranged on a common rotary shaft, and a scale beam arranged to successively coöperate with the said receptacles and arranged to allow rotary movement thereof under a load of liquid, the bottom plate of each receptacle being disposed within the preceding one and so as to be substantially horizontally above the level of the liquid within the latter when filled and below the discharge thereof when in filling position and to be struck by the said liquid upon the rotation of the receptacles.

6. In a weighing machine, the combination with a tilting weighing receptacle, its supply, and supply closing means, of weighing means coöperating with said weighing receptacle and arranged to permit stepwise tilting movement of said receptacle under an increasing load, a cam connected with said tilting receptacle and independent of the weighing means and having a plurality of cam faces arranged in succession, and means successively controlled by the successive shoulders of said cam to stepwise reduce the supply to said weighing receptacle.

7. In a weighing machine, the combination with a tilting weighing receptacle, its supply, and supply closing means, of weighing means coöperating with said weighing receptacle and arranged to permit stepwise tilting movement of said receptacle under an increasing load, a cam connected with said tilting receptacle and independent of the weighing means and having a plurality of cam faces arranged in succession, a rocking lever arranged to be successively rocked by the shoulders of said cam, and an operative connection between said rocking lever and the supply closing means.

8. In a weighing machine, the combination with a tilting weighing receptacle, its supply and supply closing means, of a scale beam coöperating with said weighing receptacle and arranged to permit stepwise tilting movement of said receptacle under an increasing load, a cam connected with said tilting receptacle and independent of the weighing means and having a plurality of cam faces arranged in succession, and means successively controlled by the successive cam faces to stepwise reduce the supply to said weighing receptacle.

9. In a weighing machine, the combination with a weighing receptacle, and weighing means coöperating therewith, of main means and subsidiary means to supply the material to be weighed to said receptacle, means to throw said subsidiary means into inoperative position, and an operative connection between the main and subsidiary means operative during a part of the throw of the subsidiary means and arranged to transmit the movement of the subsidiary means to the main means to throw the same into inoperative position.

10. In a weighing machine, the combination with a weighing receptacle, and weighing means coöperating therewith, of main and subsidiary inlet passages arranged to supply the material to be weighed to said receptacle, main and subsidiary gates or valves arranged to close said inlet passages, an operative connection between said weighing means and subsidiary gate or valve adapted to move the same in closing position, and an operative connection between said main and subsidiary gates or valves arranged to transmit during a certain throw of the subsidiary gate or valve closing movement from the subsidiary gate or valve to the main gate or valve.

11. In a weighing machine, the combination with a weighing receptacle, and weighing means coöperating therewith, of main and subsidiary inlet passages arranged to supply the material to be weighed to said receptacle, horizontal main and subsidiary gates or valves arranged to close said inlet passages, and operative connections between said gates or valves arranged to transmit after a certain throw of one valve or gate opening movement to another one.

12. In a liquid weighing device in combination with a tilting receptacle, a weighted tilting lever coöperating therewith, main and subsidiary liquid inlets arranged above the tilting receptacle, main and subsidiary valve flaps arranged to close each one of the inlets, the seat of one flap lying in a different horizontal plane from that of the other flap, and an operative connection between the weighing means and subsidiary flap adapted to move the same on its seat, the subsidiary flap being located in position for imparting closing movement to the main flap during the first part of its operation by the weighing means.

13. In a weighing machine, the combination with a weighing receptacle, and weighing means therefor, of means inoperative before the end of the weighing operation of said weighing means to reduce the active weighing force of said weighing means, means controlled by the weighing movement to reduce the supply to said receptacle, and means controlled by said weighing means and operative during the operation of said reducing means and inoperative thereafter to arrest the weighing movement of said weighing means.

14. In a weighing machine the combination with a weighing receptacle, a main scale beam coöperating therewith, and means controlled by the weighing movement of said receptacle under its load to reduce the supply to the receptacle, of a subsidiary scale beam adapted to lift said main scale beam at its counterpoise end, and means operated by said subsidiary scale beam to temporarily arrest the movement of said scale beam, said arresting means being inoperative at the end of the movement of said subsidiary scale beam.

15. In a weighing machine, the combination with a weighing receptacle, a main scale beam coöperating therewith, and means controlled by the weighing movement of said receptacle under its load to reduce the supply to the receptacle, of a subsidiary scale beam adapted to lift said main scale beam at its counterpoise end, a normally inoperative arresting element for the main scale beam, a pawl pivoted on said arresting element and adapted to rock the same when moved in one direction and to be independently moved in the opposite direction, a lever secured to said subsidiary scale beam adapted to engage said pawl for movement of said arresting element into arresting position and to release the same at the end of the rocking movement of said subsidiary scale beam.

16. In a weighing machine the combination with a tilting receptacle, and weighing means coöperating therewith, of means operative at the beginning of the weighing stroke to reduce the active force of the weighing means, a cam movable with said receptacle, and means operated by said cam to return said reducing means into initial position.

17. In a weighing machine, the combination with a tilting receptacle and a main scale beam coöperating therewith, of a subsidiary scale beam arranged to lift said main scale beam under a primary load, a cam movable with said tilting receptacle, and a rocking lever adapted to be operated by said cam and to return said subsidiary scale beam into initial position.

18. In a weighing machine, the combination with a tilting receptacle, and weighing means coöperating therewith, of a support for the scale beam, a buffer for said scale beam normally out of the path of the same, and means to lift said buffer into the path of said scale beam before the latter reaches its support.

19. In a weighing machine, the combination with a tilting receptacle, and weighing means coöperating therewith, of a support for the scale beam, a buffer for said scale beam normally out of the path of the same, a rocking lever, and a cam movable with said tilting receptacle and adapted to lift said buffer into the path of said scale beam before the latter reaches its support.

20. In a weighing machine, the combination with a weighing receptacle, and adjustable weighing means coöperating therewith, of a testing receptacle adapted to be suspended from said weighing means in lieu of the load to be filled within said weighing receptacle.

21. In a weighing machine, the combination with a weighing receptacle, adjustable weighing means coöperating therewith, and adjustable means operative during the first part of the weighing stroke to reduce the active weighing force of said weighing means, of a testing receptacle adapted to be suspended from said weighing means, and test marks within said receptacle indicating the levels to which the receptacle is to be filled for testing the weighing and reducing means.

22. In a weighing machine, the combination, of a weighing receptacle, and weighing means coöperating therewith, of a rocking lever pivoted at one end on a relatively stationary part, and carrying at its opposite end a test receptacle, and means to suspend said rocking lever at a medial point from said weighing means.

23. In a weighing machine, the combination with a weighing receptacle, and a main scale beam coöperating therewith, of a subsidiary scale beam arranged to reduce the active weighing force of the main scale beam, a cam movable with said weighing receptacle, a rocker adapted to be rocked by said cam and when rocked to raise the subsidiary scale beam out of engagement with the main scale beam, means to support the main scale beam in its non-weighing position, and a buffer arranged on said rocker and adapted to be lifted thereby into the path of the main scale beam before the latter reaches its support.

In testimony whereof we affix our signatures in presence of two witnesses.

WILHELM ESPENHAYN.
FRIEDRICH OSWALD HUNGER.

Witnesses:
WM. WASHINGTON BRUNSWICK,
HANS BENNDORF.